Figure 1:
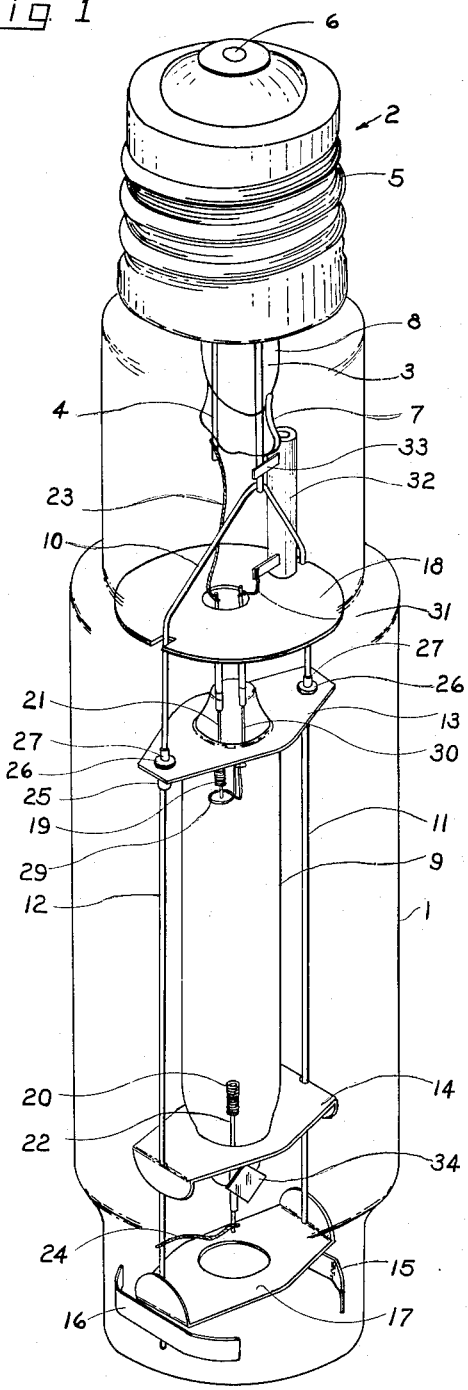

June 5, 1956     C. KENTY ET AL     2,749,462
HIGH PRESSURE MERCURY VAPOR LAMP WITH ZIRCONIUM GETTER
Filed May 31, 1952

Inventors:
Carl Kenty
Daniel A. Larson
by Otto Tichy
Their Attorney

United States Patent Office 2,749,462
Patented June 5, 1956

2,749,462

HIGH PRESSURE MERCURY VAPOR LAMP WITH ZIRCONIUM GETTER

Carl Denty, Cleveland Heights, and Daniel A. Larson, Euclid, Ohio, assignors to General Electric Company, a corporation of New York Application May 31, 1952, Serial No. 290,896

4 Claims. (Cl. 313—25)

The present invention relates to electric lamps generally and more particularly to electric discharge lamps of the high pressure mercury vapor type having a sealed quartz envelope or arc tube mounted within a sealed glass envelope.

Such lamps have been commercially available for more than fifteen years but have not as yet been made with a useful operating life as long as their rugged construction should enable them to attain. The chief cause of lamp failure heretofore has been the presence of hydrogen in the arc tube. The amount of this gas in the arc tube increased during operation of the lamp which caused a gradual increase in the lamp starting voltage until the lamps failed to start on the voltage available from the power supply. This terminated the useful life of the lamp.

The source of the hydrogen appearing in the arc tube was unknown for many years. It is now known that the hydrogen is present in the outer glass envelope and diffuses through the hot quartz wall of the arc tube when the envelope and the arc tube are at elevated temperatures during operation of the lamp.

A substantial increase in the useful operating life of such lamps was attained by increasing the size of the arc tube and the outer envelope to reduce the temperature of these lamp parts during operation. The volume of hydrogen present in the lamp and its rate of diffusion through the quartz wall of the arc tube thus was reduced to effect the advantageous result of a longer useful lamp operating life. While such lamps have a substantially longer useful operating life than lamps not including such improvements, the presence of hydrogen in the arc tube is still the main cause of lamp failure in the improved lamps of longer useful life.

The principal object of the present invention is to increase the useful operating life of lamps of the above type. Another object of the invention is to provide means in such lamps for eliminating hydrogen as a cause of lamp failure. A further object of the invention is to increase the useful life of such lamps without making expensive changes in the present lamp components. Further objects and advantages of the invention will appear from the following detailed description of species thereof.

The amount of hydrogen appearing in the lamp envelope is substantial, being of the order of 1 to 2 mm. pressure and more after several thousand hours of lamp operation. "Getters" to absorb the hydrogen in the lamp envelope have not been used heretofore in such lamps because while "getters" for hydrogen were known and have been used in electric lamps, such as incandescent lamps, for removing residual traces of hydrogen from the lamp atmosphere, it was not known that such "getters" in usable size or amount would be effective for removing from the atmosphere in the envelope such large amounts of hydrogen. Obviously, to be commercially useful the size or the amount of "getter" used in the lamp would not be so large as to increase substantially the size, weight or cost of the lamp or offer substantial obstruction to the light from the luminous constricted arc discharge in the arc tube.

We have demonstrated by forced life tests of lamps of the above type that a small piece of zirconium metal mounted in the inter-envelope space, that is in the space between the arc tube envelope and the outer glass jacket envelope, is effective for removing hydrogen from the atmosphere of said envelope for such time and in such amounts as to increase substantially the useful operating life of the lamp.

Figure 2:
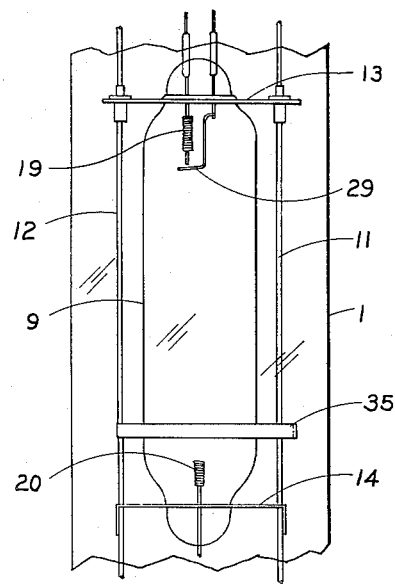
Figure 3:
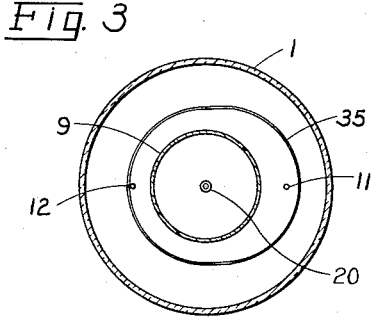

In the drawing accompanying and forming part of this specification a high pressure mercury vapor discharge lamp provided with a "getter" in accordance with the present invention is shown in which Fig. 1 is a perspective view of the lamp as seen from above;

Fig. 2 is a schematic front elevational view of a modification of the lamp shown in Fig. 1, and Fig. 3 is a schematic top view of the modification of the lamp shown in Fig. 2.

As shown, in Fig. 1 the lamp comprises a sealed outer envelope 1 of glass having the usual screw type of base 2 attached to one end thereof. Electric leading-in wires 3 and 4 are attached to the threaded shell 5 and the insulated center contact 6 of the base 2, respectively, and pass through the press part or pinch 7 of the reentrant stem tube 8 of the outer envelope 1. The sealed arc tube 9, of quartz, contains the usual starting gas, such as argon at a few mm. pressure, and a measured amount of mercury sufficient to produce an unsaturated, high pressure vapor atmosphere at the operating temperature of the tube 9.

The tube 9 is supported within the outer envelope 1 by a harness made up of a substantially U-shaped, stiff metal wire support having the portion 10 connecting its straight legs 11 and 12 welded to the inner end of said leading-in wire 3 and a pair of lateral, perforated, thin, plate-like, flexible metal supports 13 and 14 secured to the legs 11 and 12 of the wire support and engaging the tapered ends of the arc tube 9 to hold the tube therebetween.

Metal spring fingers 15 and 16 are welded to the free ends of the legs 11 and 12 and press against the wall of the envelope 1 to provide lateral support for the end of the arc tube mount. A metal tie plate 17 is also attached to and between the free ends of the legs 11 and 12 to increase the rigidity of the mount. A heat shield in the form of a perforated metal disc 18 is also attached to the legs 11 and 12 between the stem press 7 and the arc tube 9 to protect the glass press stem 7 from excessive heating. The three plate-like members 14, 17 and 18 are welded to the legs 11 and 12.

The arc tube 9 is provided with a pair of thermionically emissive main discharge supporting electrodes 19 and 20 made up of a pencil of thorium and a tungsten wire coil and mounted on current leading-in wires 21 and 22, respectively, extending through opposite ends of the tube 9 and constituting the tube terminals. The lead-in 21 of the upper main electrode 19 extends through the opening in disc 13 and is connected to the current lead 4 extending through the stem press 7 by a flexible conductor 23. A flexible conductor 24 connects the lead-in 22 for the opposite main electrode 20 to the leg 12 of the U-shaped support which is connected, through its part 10, to the lead-in wire 3 extending through the stem press 7. The main discharge current is supplied to the discharge path between the main electrodes 19 and 20 by the above described leads and connections. To prevent electrolysis of the tube material at the upper end of tube 9 the metal support 13 is electrically insulated from the legs 11 and 12 by flanged steatite ferrules 26, the flanges of the ferrules being held down against the support 13 by metal pieces or bands 27 on the legs 11 and 12.

To facilitate the starting of the main discharge, an auxiliary starting electrode 29 in the form of a metal wire loop is supported in front of the upper main electrode 19 by the inlead 30 extending through the upper or starting electrode end of the arc tube 9. When the arc tube 9 is of quartz, the inleads 30, 21 and 22 are hermetically united therewith by glass seal bodies, as is well known. The starting electrode 29 is electrically connected to the lower main electrode 20 through the said inlead 30, the flexible conductor 31 attached to one end of a suitable resistor 32 which is supported slightly above the heat shield 18 by the stiff conductor 33 welded to the inlead 3 to which the lower main electrode 20 is electrically connected as described above. The flexible conductor 31 is spaced from the metal heat shield 18 so as to be electrically insulated therefrom.

The auxiliary starting electrode 29 is preferably of the type disclosed and claimed in copending application Serial No. 152,904, of St. Louis and Pomfrett filed March 30, 1950, now Patent 2,660,692, assigned to the assignee of the present application. The electrode 29, of tungsten, for example, is of small thermal mass and is mounted in the arc stream between the electrodes 19 and 20 to assume substantially the potential of the adjacent main electrode 19 during operation of the lamp and thus eliminate electrolysis of the vitreous material between the inleads 30 and 13 of the electrodes 29 and 19, respectively. Of course, the starting electrode 29 is at the potential of the remote main electrode 20 before the discharge between the main electrodes 19 and 20 starts.

The envelope 1 of the lamp is filled with nitrogen at a pressure of about half an atmosphere at room temperature to minimize the occurrence of arc-overs between the electrical conductors therein and to beneficially effect the temperature distribution over the arc tube 9.

A square piece 34 of zirconium metal measuring ⅜ to ½ inch on a side, 0.005 of an inch in thickness and weighing about 80 milligrams is attached, as by welding, to the metal support 14 of the arc tube in such position that one of its sides faces the tapered end of the arc tube 9 through which the inlead 22 extends.

The zirconium piece 34 is thoroughly degassed before being mounted on the support 14 in the manufacture of the lamp and this may be accomplished by heating the zirconium in a vacuum to a temperature of approximately 1600° C. until all gas is driven off therefrom.

In the lamp designed for base-up operation designated commercially as the H400–EJ and manufactured and sold by the assignee of the present application the zirconium piece 34 mounted in this position is maintained at a temperature of about 400° C. during operation of the lamp. At this temperature the zirconium 34 is so effective for removing hydrogen from the atmosphere in the envelope 1 that the starting difficulties caused by the presence of hydrogen in the arc tube of prior lamps of this type are eliminated.

The fact that the zirconium 34 rejects all the nitrogen in the envelope 1, even though the nitrogen is at enormous pressure relative to the pressure of the hydrogen, and absorbs hydrogen in such large amounts even though the pressure of the hydrogen is down to a few microns, is remarkable.

In Figs. 2 and 3 of the drawing, in which figures the same numbers denote the same parts as in Fig. 1, we have shown schematically a zirconium ribbon 35 formed into a closed loop, mounted around and spaced from the lower portion of the arc tube 9 and welded to the support wire 12. Forming the zirconium in this manner makes possible the heating thereof by high frequency currents for degassing purposes after the lamp has been baked and exhausted and before the envelope 1 is filled with nitrogen and sealed off.

Obviously, the zirconium metal may be present in other forms, such as in wire or powder form, in the envelope 1 and may be mounted in other positions with respect to the arc tube 9 provided, however, that it is maintained at a temperature, about 400° C., at which it is absorptive of hydrogen during operation of the lamp. Of course, the most effective quantity of zirconium for lamps of different sizes and wattages will be different, but we have demonstrated that the quantity of zirconium required to eliminate the starting problem caused by hydrogen in prior commercial lamps of the above type is small enough to make the use of this material feasible for this purpose in these lamps.

What we claim as new and desire to secure by Letters Patent of the United States is:

1. A high pressure mercury vapor discharge lamp comprising a quartz arc tube envelope exhibiting some perviousness to hydrogen at elevated temperatures and defining a discharge space containing an ionizable medium including mercury and having sealed therein a pair of discharge supporting electrodes, a sealed glass outer jacket enclosing the arc tube, means supporting the arc tube within the jacket and providing electrical connections to said electrodes, said lamp being subject to gradual liberation of hydrogen in the inter-envelope space in amounts sufficient to build up a pressure at least of the order of a millimeter after several thousand hours operation and being deleteriously affected by diffusion of such hydrogen into the arc tube from the inter-envelope space, and a getter consisting of zirconium metal mounted in the inter-envelope space and in heat receiving relationship to said arc tube to absorb hydrogen evolved in the inter-envelope space prior to diffusion into the arc tube and thereby maintain the discharge space within the arc tube substantially free of hydrogen.

2. A high pressure mercury vapor discharge lamp comprising a quartz arc tube envelope exhibiting some perviousness to hydrogen at elevated temperatures and defining a discharge space containing an ionizable starting gas and mercury and having sealed therein a pair of discharge supporting electrodes, a sealed glass outer jacket envelope enclosing the arc tube, means supporting the arc tube within the jacket and providing electrical connections to said electrodes, said lamp being subject to gradual liberation of hydrogen in the inter-envelope space in amounts sufficient to build up a pressure at least of the order of a millimeter after several thousand hours operation and being deleteriously affected by diffusion of such hydrogen into the arc tube from the inter-envelope space, and a piece of zirconium metal attached to said support means within the interenvelope space and maintained at a hydrogen gettering temperature in normal operation of the lamp, said zirconium operating to absorb hydrogen evolved in said inter-envelope space prior to diffusion into the arc tube, and, by maintaining said hydrogen pressure in the inter-envelope space down to a few microns, serving to maintain the discharge space within the arc tube substantially free of hydrogen.

3. A high pressure mercury vapor discharge lamp comprising a quartz arc tube envelope exhibiting some perviousness to hydrogen at elevated temperatures and defining a discharge space containing an ionizable starting gas and mercury and having sealed therein a pair of discharge supporting electrodes, a sealed glass outer jacket envelope enclosing the arc tube and containing nitrogen at a pressure of the order of ½ atmosphere, means supporting the arc tube within the jacket and providing electrical connections to said electrodes, said lamp being subject to gradual liberation of hydrogen in the inter-envelope space in amounts sufficient to build up a pressure at least of the order of a millimeter after several thousand hours operation and being deleteriously affected by diffusion of such hydrogen into the arc tube from the inter-envelope space, and a piece of zirconium metal attached to said support means within the inter-envelope space and in proximity to said arc tube whereby to be heated to a temperature of about 400° C. during operation of the lamp in order to operate as a hydrogen getter, said zirconium serving to absorb hydrogen evolved in said inter-envelope space and, by maintaining the hydrogen pressure in the inter-envelope space down to a few microns, serving to substantially prevent diffusion of hydrogen into the discharge space within the arc tube.

4. A high pressure mercury vapor discharge lamp as defined in claim 3 and wherein the means supporting the arc tube within the jacket include transverse metal support members each having an aperture accommodating an end of the arc tube, and the piece of zirconium metal is attached to one of said transverse members in proximity to the end of the arc tube engaged thereby.

References Cited in the file of this patent

UNITED STATES PATENTS

| | | |
|---|---|---|
| 1,976,385 | Bruijnes | Oct. 9, 1934 |
| 2,047,018 | Fairbrother | July 7, 1936 |
| 2,172,968 | De Boer | Sept. 12, 1939 |
| 2,203,896 | De Boer | June 11, 1940 |
| 2,208,987 | Kuhne | July 23, 1940 |
| 2,291,952 | Dench | Aug. 4, 1942 |
| 2,362,468 | Clark | Nov. 14, 1944 |
| 2,477,110 | Atlee et al. | July 26, 1949 |
| 2,545,884 | Isaacs et al. | Mar. 20, 1951 |